Dec. 26, 1939.   E. A. TRUSSELL   2,185,004
METHOD OF BINDING SHEET MATERIAL
Original Filed Aug. 25, 1934   2 Sheets-Sheet 1
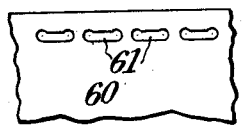
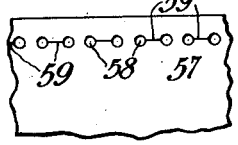
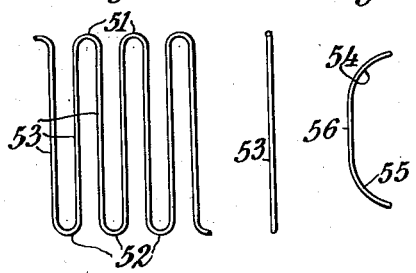
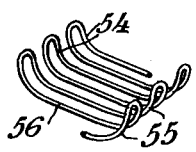
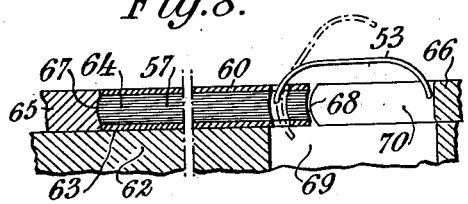
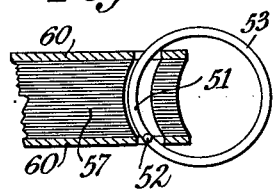
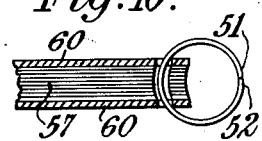
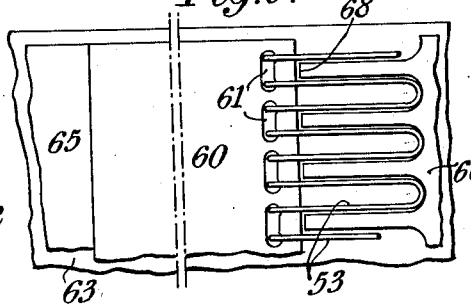
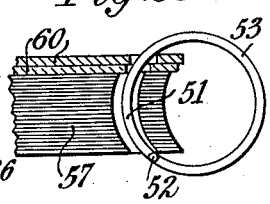
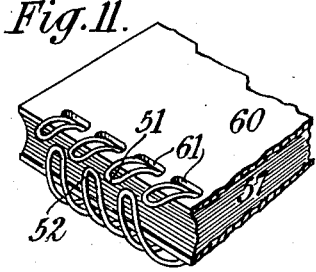
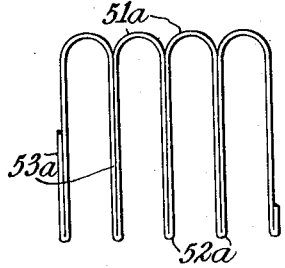
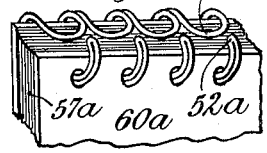
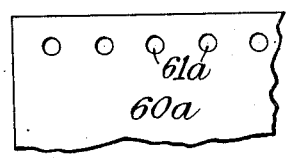
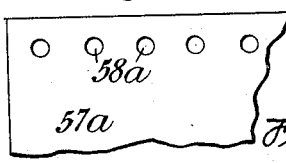
INVENTOR
Emory A. Trussell,
BY
Fraser, Myers & Manley,
ATTORNEYS.

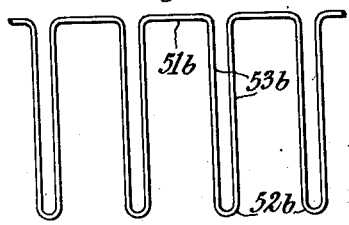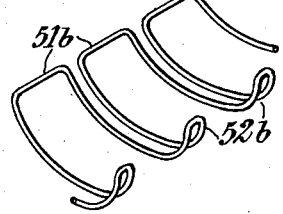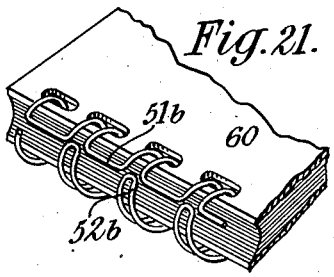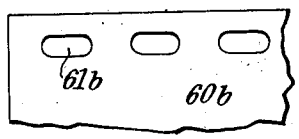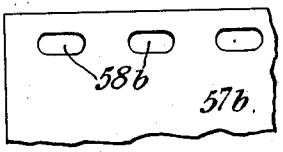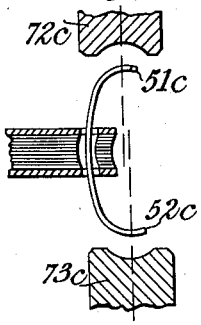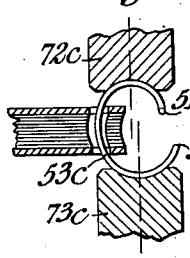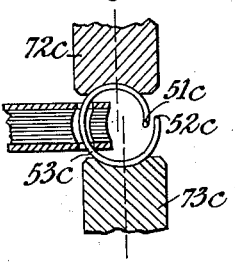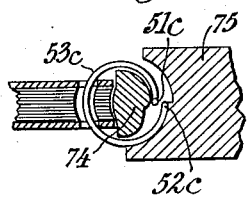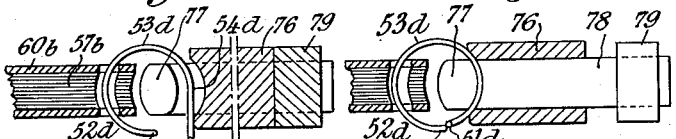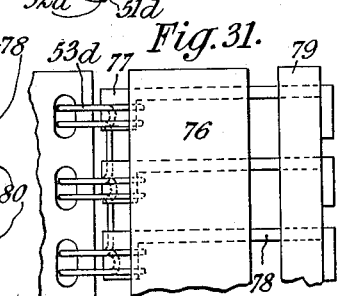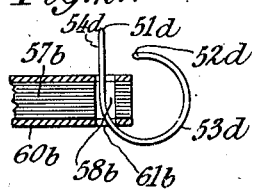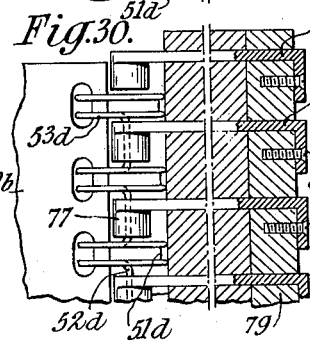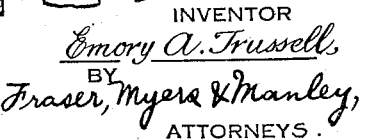

Patented Dec. 26, 1939

2,185,004

UNITED STATES PATENT OFFICE 2,185,004

METHOD OF BINDING SHEET MATERIAL

Emory A. Trussell, Milwaukee, Wis., assignor to Trussell Manufacturing Company, Poughkeepsie, N. Y., a corporation of New York Original application August 25, 1934, Serial No. 741,360. Divided and this application March 30, 1938, Serial No. 198,841

14 Claims. (Cl. 281—25)

This application is a division of my prior application, Serial No. 741,360, filed August 25, 1934; U. S. Patent No. 2,116,589, issued May 10, 1938.

This invention relates to improved methods of binding sheet material. Although of general application, the invention is particularly adapted for use in the binding of memorandum books, blank books, advertising pamphlets, printed books, and note books of the type commonly used by stenographers.

It is an object of the invention to provide a simple and inexpensive but practical method of binding sheets of thin material including, if desired, surface sheets of heavier material to serve as covers, by the application of a metal binder, preferably of wire, portions of which may be bent to forms such as may be readily thrust through perforations in the margins of the sheets, previously provided to receive them, and then further bent to forms such that the sheets may not be accidentally separated from the binder.

In the accompanying drawings illustrating wire binders and apparatus which may be used in practicing methods embodying the foregoing invention and bound sheet constructions which may be produced by the use of such methods:

Figure 1 is a plan view of a piece of wire from which a binding element for a book may be made.

Fig. 2 is a like view of the wire after it has been bent to a form such as to provide a series of reversely disposed loops all lying in the same plane.

Fig. 3 is an end view of the bent wire illustrated by Fig. 2.

Fig. 4 is an end view of the bent wire illustrated by Figs. 2 and 3 after the portions of wire adjacent each set of loops have been bent to substantially circular form, so that the center line of the wire may lie in an imaginary surface of trough-like form.

Fig. 5 is a perspective view of the wire illustrated by Fig. 4.

Fig. 6 is a plan view of a fragmentary portion of a sheet of paper or other thin material, any reasonable number of which may be bound together by the wire illustrated by Figs. 4 and 5.

Fig. 7 is a plan view of a fragmentary portion of a sheet of heavier material, two of which may be used as covers for a plurality of sheets like the one illustrated by Fig. 6.

Fig. 8 is a transverse cross-sectional view through a pad of sheets and pair of covers to be bound, the partly formed binding wire, and fragmentary portions of some of the tools which may be used to facilitate the insertion of the binding wire.

Fig. 9 is a plan view of portions of the tools and partly formed book illustrated by Fig. 8.

Fig. 10 is a fragmentary, transverse, sectional view of the sheets, covers and binding wire after the bending of the wire has been completed and the book has been removed from the tools.

Fig. 11 is a perspective view of a fragmentary portion of a book comprising sheets, covers and a completed binding wire.

Fig. 12 is a plan view of a piece of wire bent to a form adapted to serve as a blank from which a modified form of binding wire may be constructed.

Fig. 13 is a perspective view of the wire blank illustrated by Fig. 12 after it has been bent to a form such that the center line of the wire may lie in an imaginary surface of trough-like form.

Fig. 14 is a plan view of a fragmentary portion of a sheet of paper or other appropriate material adapted to serve as a leaf of a book to be bound by a wire-attaching element of a form which may be made from the blank shown in Fig. 12.

Fig. 15 is a like view of a fragmentary portion of a sheet of heavier material, a pair of which may be used as covers for a book having sheets like the one illustrated by Fig. 14.

Fig. 16 is a perspective view of a fragmentary portion of a completed book having a binding wire made from the blank illustrated by Fig. 12.

Fig. 17 is a plan view of a wire blank from which a second modified form of binding wire embodying the invention may be constructed.

Fig. 18 is a perspective view of the wire illustrated by Fig. 17 after it has been bent to a form such that the center line of the wire will lie in an imaginary surface of trough-like form.

Fig. 19 is a plan view of a fragmentary portion of a sheet of paper any reasonable number of which might be bound by a form of binding wire to be constructed from the blank illustrated by Fig. 17.

Fig. 20 is a fragmentary view of a sheet of heavier material, a pair of which may be used for covers of sheets to be bound by the binding wire made from the blank illustrated by Fig. 17.

Fig. 21 is a perspective view of a fragmentary portion of a finished book having a binding wire of the form to be made from the blank illustrated by Fig. 17.

Fig. 22 is a transverse cross-sectional view of parts of a pad of sheets and covers, a partly formed binding wire, and parts of the dies used to complete the bending of the binding wire, the longitudinal axes of the dies being disposed slightly out of alignment with respect to each other as indicated by broken lines.

Fig. 23 is a like view of the parts illustrated by Fig. 22, the dies being indicated in positions assumed after they have partly completed the bending of the wire.

Fig. 24 is a like view of the parts illustrated by Figs. 22 and 23 after the bending has been completed and prior to the release of the binding wire.

Fig. 25 is a like view of the parts of the book illustrated by Figs. 22, 23 and 24 after being released from the wire-bending dies, the reversely disposed coils of the binding wire being represented between elements of a pair of aligning dies by which the sheet-attaching loops of the binding wire may be bent to a substantially circular form.

Fig. 26 is a perspective view of an intermediate form to which the blank illustrated by Fig. 17 may be bent and from which a binding wire like that illustrated by Fig. 21 may be constructed in accordance with a method of bending somewhat different from the methods thus far described.

Fig. 27 is a transverse cross-sectional view of a pad of sheets and a pair of covers, the binding wire being represented in the position which it assumes after the loops of relatively closed formation have been thrust through the marginal perforations in the sheets.

Fig. 28 is a like view of the parts illustrated by Fig. 27, the binding wire having been rotated through an angle of approximately 180 degrees, and a pair of wire-bending dies being indicated by means of which the bending of the binding wire may be completed.

Fig. 29 is a like view of the parts illustrated by Fig. 28, the dies having been moved to positions such as to complete the bending of the wire.

Fig. 30 is a view, partly in plan and partly in plan and partly in horizontal cross section, of the parts illustrated by Fig. 28.

Fig. 31 is a plan view of the parts illustrated by Fig. 29.

Fig. 32 is a transverse sectional view of parts of a pad of sheets and a pair of covers having the binding wire embodying the invention engaged therewith in a manner such that the portions of the wire which connect the sheet-attaching rings may be closed between one of the covers and the adjacent sheet.

Fig. 33 is a like view of the parts illustrated by Fig. 32, the two covers and the sheets being indicated in the positions in which they may be assembled to facilitate the insertion of the binding wire, after which one of the covers may be turned about the wire to the position indicated in Fig. 32.

A wire-bound book of the form illustrated by Fig. 11 may be constructed in various ways, one of which will be described with the aid of Figs. 1 to 10, inclusive, of the drawings. Fig. 1 represents a piece of relatively soft wire 50, which may first be bent to the form of the blank illustrated by Figs. 2 and 3 comprising reversely disposed loops 51, 52 and intervening connecting portions 53 all lying in the same plane, as illustrated by Fig. 3. These loops may be bent to a form such that the center lines of all portions of the wire will lie in an imaginary surface of trough-like form as indicated in end view by Fig. 4. The form of the partly completed binding wire, as illustrated by Fig. 4, may comprise substantially circular portions 54, 55 and intervening straight portions 56. A short length of completed binding wire of the form illustrated by Fig. 4 is shown in perspective in Fig. 5 in readiness to be made use of in binding a number of sheets of a blank book, memorandum book, circular, printed publication, or similar leaved construction.

In Fig. 6 is illustrated a fragment of one of a number of sheets 57 of paper or other appropriate material, which may be bound together by the binding wire embodying the invention. Such sheets may be perforated along the edges to be bound in such manner as to provide for suitable interengagement with the binding wire. As indicated in Fig. 6, the sheet may be provided with perforations 58 spaced in accordance with the spacing of the sheet-attaching loops or rings of the binding wire hereinafter to be described, and in order that the attaching loops may be thrust through the sheets in the form of connected pairs, the sheets 57 may be slitted between adjacent perforations as at 59. It will be apparent, however, that any form of perforation of a shape and dimensions such as to accommodate a connected pair of sheet-attaching loops or rings may be substituted for the specific type of perforation illustrated by Fig. 6.

In Fig. 7 is illustrated a fragment of a sheet 60 of material appropriate for use as a protector or cover for a book or pad built up of the sheets 57. The cover sheet 60 is likewise indicated as being provided with perforations 61 of suitable form and dimensions to permit connected pairs of loops or rings of a binding wire to be thrust through them. In building up a book or pad, any desired number of sheets 57 may be superimposed one upon another, and, preferably, enclosed between a pair of sheets 60, after which the loops of the binding wire may be thrust through the registering perforations 58, 59, 61 of the sheets and covers and bent by the use of suitable dies to forms such as to hold the parts of the book in their assembled relation as illustrated by Figs. 10 and 11.

In Figs. 8 and 9 are illustrated parts of certain tools which may be made use of as an aid in carrying out one method of inserting the loops of the binding wire in the perforations of the sheets and covers of the book and of bending them to their completed forms.

In Fig. 8, 62 represents a table or support having a flat top 63 on which the book or pad 64 comprising sheets 57 and covers 60 may be supported, and, while thus supported, they may be pressed edgewise between a pair of sheet-shifting tools 65, 66, the former having a concave sheet-engaging surface 67 and the latter a convex sheet-engaging surface 68. By gently pressing the two sheet-shifting elements 65, 66 towards each other, the sheets and covers will be adjusted as indicated in Fig. 8 to positions such that the perforated portions will be curved to an extent dependent upon the curvature of the surfaces 67, 68 of the sheet-shifting tools. This curvature may be made to conform substantially with the curvature of the portions 54, 55 of the partly formed binding wire, so that one set of the reversely disposed loops, that is, either the loops 51 or loops 52, may be readily thrust into the perforations, after which they may be closed by the use of suitable dies to the positions indicated in Fig. 10.

To facilitate the insertion of the partly formed binding wire in the perforations in the pad of sheets to be bound, an opening may be provided in the support, as at 69, and the tool 66 may be slotted, as at 70 (see Figs. 8 and 9).

It will be apparent that the finished binding wire affords a very simple and easily constructed and assembled, yet highly satisfactory, means whereby the sheets and covers of the book, if covers are used, may be attached together, after which either cover and any number of the sheets may be freely moved around the loops of the binding wire through approximately 360 degrees so that either page of any leaf of the book may be a surface page.

In Fig. 12 is disclosed a form of blank from which a modified form of binding wire embodying the invention may be constructed. The blank illustrated by Fig. 12 differs from the one illustrated by Fig. 2 in that the loops 52a are closed upon each other and the loops 51a are of a more open construction so that the intervening connecting wires 53a are disposed in spaced pairs, the wires of each pair being in contact with each other. If a book or pad is to be bound by a sheet-attaching device made from the blank illustrated by Fig. 12, the perforations 58a in sheets 57a (Fig. 14) and the perforations 61a in cover sheets 60a (Fig. 15) may be relatively small as compared with the spaces between said perforations, and, if desired, may be simple circular holes as indicated, each hole being merely of a diameter equal to two diameters of the wire plus a reasonable clearance space.

When using a blank of the form of the one illustrated by Fig. 12, the wires 53a may be first bent to the forms illustrated by Fig. 13 so that their center lines lie in an imaginary surface of trough-like form, after which the loops 52a may be thrust into the perforations 61a of the covers and 58a of the sheets, and the sheet-attaching loops formed by the wires 53a bent by suitable dies to the form of substantially closed sheet-attaching loops or rings, as clearly indicated in Fig. 16.

In Fig. 17 is illustrated a form of blank differing from those illustrated by Figs. 2 and 12 in that the loops 52b are of a relatively closed configuration as compared with the loops 51b, the forms of the loops being such that the intervening wires 53b are all spaced from each other in pairs, none of the wires being in contact, but the wires of each pair being closer to each other than to the wires of adjacent pairs.

The blank illustrated by Fig. 17 may be bent to the form illustrated by Fig. 18 in which the centers of the wires 53b between the loops 52b and 51b lie in an imaginary surface of trough-like form, after which the loops 52b and portions of the connecting wires 53b may be thrust into perforations 58b in sheets 57b (Fig. 19) to be connected by the binding wire, and, if desired, through perforations 61b in cover sheets 60b (Fig. 20), and then bent by suitable wire-rolling dies until the sheet-attaching loops formed from the wires 53b assume the forms of substantially closed rings, as indicated in Fig. 21. When a binding wire of the form embodying the invention as disclosed by Figs. 17 to 21 is used, the perforations 58b and 61b, as shown in Figs 19 and 20, need be only of a size sufficient to accommodate a pair of the closely spaced wires 53b, so that the spaces between a pair of perforations may be greater than the lengths of the perforations.

In Figs. 22 to 25, inclusive, are disclosed portions of tools which may be used as an aid in completing the bending of a binding wire embodying the invention. In accordance with one method which may be practiced with the aid of such tools the wire-rolling dies 72c, 73c are disposed with their axes slightly displaced one with respect to the other as indicated by broken lines in Fig. 22. When the dies are moved towards each other, as indicated in Figs. 23 and 24, to roll the portions of wire 53c to their substantially closed, ring-like forms adapted to serve as sheet-attaching loops, the reversely disposed loops 51c, 52c, will be caused to overlap in a slightly offset relation, as indicated in Fig. 24, so that the loops of one set will not be crowded into the spaces between the loops of the other set and cause portions of the binding wire to be distorted. The relative movement of the dies 72c and 73c is continued until the looped portions 51c, 52c have been caused to overlap to an extent only such that, when the dies are withdrawn and the bent portions of the wire relieved from strain, they will spring back to an extent such that the loops 51c, 52c will assume the positions illustrated by Fig. 25, after which, if desired, the portions of the wire adjacent the loops 51c, 52c may be bent between a pair of aligning dies 74, 75, which may be moved toward each other and thereby force the looped portions 52c into registration with, and even slightly beyond, the looped portions 51c to an extent such that when released from the dies the sheet-attaching loops formed by the portions 53c of the wire will be of substantially circular form, as indicated in Fig. 10.

It will be apparent that the methods of installing and completing the bending of the binding wires which have been described with the aid of Figs. 8, 9 and 22 to 25 of the drawings are equally adapted to be used in making binding wires of any of the three forms illustrated by Figs. 11, 16 and 21.

With the aid of Figs. 26 to 31, inclusive, another method in accordance with which a binding wire embodying the invention may be completed will be described. When this method is employed, a blank, which might, for example, be one like the blank illustrated by Fig. 17, may first be bent by suitable tools to the form illustrated by Fig. 26 comprising reversely disposed loops 51d, 52d and intervening wire portions 53d, parts 54d of the wire portions 53d being straight, as indicated, so as to lie in one and the same plane. It will be apparent that a similar partly completed binding wire might likewise be made from a blank of the form illustrated by Fig. 2 or from a blank of the form illustrated by Fig. 12. The loops 51d and adjacent portions 54d of the binding wire may be thrust through perforations 58b, 61b of sheets of paper 57b and cover plates 60b like those illustrated by Figs. 19 and 20, as indicated in Fig. 27, after which the partly formed binding wire may be rotated to the position with respect to the sheets and covers indicated in Fig. 28. The portions 54d of the binding wire may then be bent to the same substantially circular form as the portions 53d by pressing them between a die 76 and a series of dies 77 as indicated in Figs. 28 to 31, inclusive. The dies 77 may be supported in an offset relation at the ends of a series of supporting bars 78 by which they may be secured to a common operating bar 79 by screws 80 or other appropriate fastening means, as clearly shown in Fig. 30. The bars 78 may, as indicated, be passed through slots provided therefor in the die 76, so that the dies 77 may be moved towards the die 76 by forcibly drawing the operating bar 79 rearwardly or away from the body portion of the die 76 in order that the parts will assume the relative positions shown in Figs. 29 and 31. When using the dies 76, 77, to bend the parts 54d of the binding wire to circular form, the operating bar 79 will first be moved towards the body portion of the die 76 so as to separate the dies 76 and 77. The book and partly formed binding wire will then be moved to a position relative to the bending tools illustrated by Figs. 28 and 30, after which relative movements may be imparted to the book and tools such as to cause the dies 77 to enter the partly formed sheet-attaching rings of the binding wire. The common operating bar 79 may then be moved away from the rear body portion of the die 76, thus causing the dies 77 to bend the parts 54d of the binding wire into the concave face portion of the die 76 as indicated in Figs. 29 and 31. If desired, the forms of the dies 76, 77 may be such as to slightly overbend the portions of wire 54d, as indicated by Fig. 29, in order that when released from the dies the attaching loops will be of the true circular form illustrated by Fig. 10. The release of the finished binding wire from the dies is effected by moving the operating bar 79 towards the rear portion of the die 76 and then imparting a relative lateral movement to the book and tools in order to remove the dies 77 from the attaching loops.

The forms of blanks and partly completed sheet binders illustrated by Figs. 2, 4, 5, 8, 12, 13, 17, 18, 22, 26, 27 and 28 are, to a certain extent, intended to be diagrammatic only. The drawings and descriptions of these wire structures are intended to indicate that parts of the wire may first be bent to the approximate curvature of the sheet-attaching rings of a finished binder and the bending completed after the blank or partly finished binder has been assembled with sheets to be bound. The curvature and relative proportions of the parts of the blanks to be bent before assembling the blanks with the sheets and the relative portions of the unbent or incompletely bent portions relied upon to maintain the ends of the sheet-attaching loops or rings spaced sufficiently to permit the sheets to be assembled with the binder may be varied to suit conditions to be met in practice. It is not essential that so great a portion of the wires from which the sheet-attaching rings or loops are to be formed be left straight or substantially straight as is indicated in the drawings. All that is necessary is that the form of the partly completed rings be such as to permit the sheets to be inserted between the spaced ends of the rings. By bending a relatively large portion of each ring to the substantial curvature of the intended completed ring before assembling the binder with the sheets to be bound and by using appropriate dies to complete the bending of the rings, binders having sheet-attaching rings or loops of substantially circular form may be readily formed.

In each of the various forms of blanks which have been illustrated for use in making sheet binders embodying the invention it will be observed that one pair of corresponding ends of the two wires which pass through the same perforations in the sheets assembled with the binder are united by a rounded portion such as to cause the connected ends of the wires to converge, and that the opposite ends of the same wires are connected with adjacent ends of wires of adjacent pairs by uniting portions of a curved form such as to cause the parts of the wires approaching the connections between wires of different pairs to diverge or flare away from each other so that when the pairs of wires which form the sheet-attaching loops or rings are bent to their closed positions the converging end portion of the pair of mutually united wires which serve as a double sheet-attaching ring or loop may be caused to extend into the space between the diverging or outwardly flared portions of the opposite ends of the same wires where they are united with wires of adjacent rings without spreading or crowding said rings, so that the alternate ring-uniting portions of the finished binder will be arranged in an overlapping, zigzag relation such as to prevent the separation of sheets from the binder along the zone of adjacent overlapping ring ends.

If a pad of sheets and cover elements 57, 60 are assembled with a binding wire 51, 52, 53 in the manner hereinbefore described, the looped portions 51, 52 will be exposed when the cover elements 60 are in contact with the outermost sheets 57 of the pad. If desired, the parts may be assembled with the two cover elements 60 in contact with each other at one surface of the pad of sheets 57, as indicated in Fig. 33, in which case the looped portions 51, 52 will be exposed after the binding wire has been completed. One of the cover elements 60 may be then turned about the portions 53 of the binding wire through approximately 360 degrees to the position indicated in Fig. 32 with the looped portions 51, 52 between one of the covers 60 and the adjacent sheet 57. The looped portions of the binding wire will then be concealed when the book is closed. It will be apparent that the sheets and covers may be so assembled that the looped portions 51, 52 may be between any desired pair of sheets 57 except when the book has been opened so as to separate those particular sheets.

Although the binding wire has been herein disclosed as one extending substantially from one end to the other of the margins of the sheets to be bound, it will be apparent that its length and the number of loops to be used need be only such as is necessary to adapt it to satisfactorily serve the intended purpose, and that, if desired, binding wires of a given size and weight might be made up in standard lengths including a plurality of pairs of sheet-attaching loops, and any number of such binding wires used in an end-to-end relation along the margins of the sheets to be attached dependent upon the sizes of the sheets. It is not at all essential that a single wire comprising a single series of pairs of loops extend the entire length of the sheets.

It is not intended that the invention be limited to the specific methods of binding sheets herein disclosed for purposes of illustration, but that it should include modifications and variations thereof within the scope of the appended claims.

What is claimed is:

1. The method of binding sheets of material into book form, which consists in perforating the sheets at spaced intervals along the edges to be bound; bending a piece of wire into a form comprising a plurality of reversely disposed loops united by intervening, parallel connecting portions, the said loops having their two sets of oppositely directed end portions disposed respectively along a pair of parallel, straight lines, and having material parts of their intervening, connecting portions bent about axes parallel to the lines lying along the loop-ends to a curvature approximating that of a closed circular, ring-like, sheet-attaching element of a binder to be formed, leaving other material parts of the intervening portions of forms necessitating further bending to close and thus complete such elements; thrusting alternate loops of the partly formed binder through the perforations in the sheets; and completing the binder by a further bending of portions requiring such treatment to give all parts of the binder construction between the ends of the alternate loops the degree of curvature needed to close and complete the approximately circular ring-like attaching elements.

2. The method of binding sheets of material into book form, which consists in perforating the sheets at spaced intervals along the edges to be bound; bending a piece of wire into a form comprising a plurality of reversely disposed loops united by intervening, parallel connecting portions, the said loops having their two sets of oppositely directed end portions disposed respectively along a pair of parallel, straight lines, and having material parts of their intervening, connecting portions adjacent each of the outwardly directed loop-ends bent about axes parallel to the lines lying along said ends to a curvature approximating that of a closed, circular, ring-like, sheet-attaching element of a binder to be formed, leaving intermediate parts of material extent necessitating further bending to close and thus complete such elements; thrusting alternate loops of the partly formed binder through the perforations in the sheets; and completing the binder by a further bending of portions requiring such treatment to give all parts of the binder construction between the ends of the alternate loops the degree of curvature needed to close and complete the approximately circular ring-like attaching elements.

3. The method of binding sheets of material into book form, which consists in perforating the sheets at spaced intervals along the edges to be bound; bending a piece of wire into a form comprising a plurality of reversely disposed loops united by intervening, parallel connecting portions, the said loops having their two sets of oppositely directed end portions disposed respectively along a pair of parallel, straight lines, and having material parts of their intervening, connecting portions, adjacent one of the two sets of alternate, outwardly directed loop-ends, bent about axes parallel to the lines lying along said ends to a curvature approximating that of a closed, circular ring-like sheet-attaching element of a binder to be formed, leaving other material parts of the intervening, connecting portions, adjacent the other of the two sets of alternate, outwardly directed loop-ends, necessitating further bending to close and thus complete such elements; thrusting alternate loops of the partly formed binder through the perforations in the sheets; and completing the binder by a further bending of portions requiring such treatment to give all parts of the binder construction between the ends of the alternate loops the degree of curvature needed to close and complete the approximately circular ring-like attaching elements.

4. The method of binding sheets of material into book form, which consists in perforating the sheets at spaced intervals along the edges to be bound; bending a piece of wire into a plurality of reversely disposed loops united by intervening, parallel, straight connecting portions, the said loops having their two sets of oppositely directed end portions disposed respectively along a pair of parallel, straight lines; bending parts of the intervening, connecting portions to forms including elements of material extent having a degree of curvature about axes parallel with the axes of the lines which bound the loop-ends substantially conforming with that which would be appropriate for a closed, ring-like, sheet-attaching element of a binder to be formed, and other portions of material extent requiring further bending to form the closed, sheet-attaching elements of a finished binder; thrusting alternate loops of the partly formed binder through the perforations in the sheets; and completing the binder by a final bending of parts of the intervening, connecting portions of the loops to give all parts of the binder construction between the ends of the alternate loops the degree of curvature needed to close and complete the ring-like attaching elements.

5. The method of binding sheets of material into book form, which consists in perforating the sheets at spaced intervals along the edges to be bound; bending a piece of wire into a plurality of reversely disposed loops united by intervening, parallel, straight connecting portions, the said loops having their two sets of oppositely directed end portions disposed respectively along a pair of parallel, straight lines; bending parts of the intervening, connecting portions to forms including elements of material extent, adjacent each of the outwardly directed loop-ends, having a degree of curvature, about axes parallel with the lines which bound the loop-ends, substantially conforming with that which would be appropriate for a closed, ring-like, sheet-attaching element of a binder to be formed and intervening portions of material extent requiring further bending to form the closed, sheet-attaching elements of a finished binder; thrusting alternate loops of the partly formed binder through the perforations in the sheets; and completing the binder by a final bending of parts of the intervening, connecting portions of the loops to give all parts of the binder construction between the ends of the alternate loops the degree of curvature needed to close and complete the ring-like attaching elements.

6. The method of binding sheets of material into book form, which consists in perforating the sheets at spaced intervals along the edges to be bound; bending a piece of wire into a plurality of reversely disposed loops united by intervening, parallel, straight connecting portions, the said loops having their two sets of oppositely directed end portions disposed respectively along a pair of parallel, straight lines; bending parts of the intervening, connecting portions to forms including elements of material extent, adjacent one of the two sets of alternate, outwardly directed loop-ends, having a degree of curvature, about axes parallel with the lines which bound the loop-ends, substantially conforming with that which would be appropriate for a closed, ring-like, sheet-attaching element of a binder to be formed and other portions of material extent adjacent the other of the two sets of alternate, outwardly directed loop-ends requiring further bending to form the closed, sheet-attaching elements of a finished binder; thrusting alternate loops of the partly formed binder through the perforations in the sheets; and completing the binder by a final bending of parts of the intervening, connecting portions of the loops to give all parts of the binder construction between the ends of the alternate loops the degree of curvature needed to close and complete the ring-like attaching elements.

7. The method of forming a binder for sheet material, which consists in bending a piece of wire into a plurality of reversely disposed loops united by intervening, parallel, straight connecting portions, the said loops having their two sets of oppositely directed end portions disposed respectively along a pair of parallel straight lines;

and then bending parts of the intervening, connecting portions to forms including elements of material extent having a degree of curvature about axes parallel with the lines which bound the loop-ends substantially conforming with that which would be appropriate for a closed, circular ring-like, sheet-attaching element of a binder to be formed and other portions of material extent requiring further bending to, form the closed sheet-attaching elements of a finished binder.

8. The method of forming a binder for sheet material, which consists in bending a piece of wire into a plurality of reversely disposed loops united by intervening, parallel, straight connecting portions, the said loops having their two sets of oppositely directed end portions disposed respectively along a pair of parallel straight lines; and then bending parts of the intervening, connecting portions to forms including elements of material extent, adjacent each of the outwardly directed loop-ends, having a degree of curvature, about axes parallel with the lines which bound the loop-ends, substantially conforming with that which would be appropriate for a closed, circular, ring-like, sheet-attaching element of a binder to be formed and intervening portions of material extent requiring further bending to form the closed, sheet-attaching elements of a finished binder.

9. The method of forming a binder for sheet material, which consists in bending a piece of wire into a plurality of reversely disposed loops united by intervening, parallel, straight connecting portions, the said loops having their two sets of oppositely directed end portions disposed respectively along a pair of parallel straight lines; and then bending parts of the intervening, connecting portions to forms including elements of material extent, adjacent one of the two sets of alternate, outwardly directed loop-ends, having a degree of curvature, about axes parallel with the lines which bound the loop-ends, substantially conforming with that which would be appropriate for a closed, circular, ring-like, sheet-attaching element of a binder to be formed and other portions of material extent adjacent the other of the two sets of alternate, outwardly directed loop-ends requiring further bending to form the closed, sheet-attaching elements of a finished binder.

10. The method defined by claim 2, in accordance with which the bending of the parts of the wire between the loops, after insertion in the perforations in the sheets to be bound, is effected by a pair of wire-rolling dies slightly displaced one with respect to the other so as to spiral the sheet-attaching elements sufficiently to permit the bending to be continued until the ends of the oppositely disposed loops have been caused to abnormally overlap one another, whereby on release from the dies the resiliency of the strained wire elements will cause the ends of the loops to spring back into positions of substantial alignment.

11. The method defined by claim 2, in accordance with which the bending of the parts of the wire between the loops, after insertion in the perforations in the sheets to be bound, is effected by a pair of wire-rolling dies slightly displaced one with respect to the other so as to spiral the sheet-attaching elements sufficiently to permit the bending to be continued until the ends of the oppositely disposed loops have been caused to abnormally overlap one another, whereby on release from the dies the resiliency of the strained wire elements will cause the ends of the loops to spring back into positions of substantial alignment, the substantially aligned end portions of the sheet-attaching elements being then brought into more perfect alignment by forcing them past each other radially between dies to an extent such that when relieved from the bending strain they will spring back into the desired positions of alignment.

12. The method defined by claim 5, in accordance with which the bending of the parts of the wire between the loops, after insertion in the perforations in the sheets to be bound, is effected by a pair of wire-rolling dies slightly displaced one with respect to the other so as to spiral the sheet-attaching elements sufficiently to permit the bending to be continued until the ends of the oppositely disposed loops have been caused to abnormally overlap one another, whereby on release from the dies the resiliency of the strained wire elements will cause the ends of the loops to spring back into positions of substantial alignment.

13. The method defined by claim 5, in accordance with which the bending of the parts of the wire between the loops, after insertion in the perforations in the sheets to be bound, is effected by a pair of wire-rolling dies slightly displaced one with respect to the other so as to spiral the sheet-attaching elements sufficiently to permit the bending to be continued until the ends of the oppositely disposed loops have been caused to abnormally overlap one another, whereby on release from the dies the resiliency of the strained wire elements will cause the ends of the loops to spring back into positions of substantial alignment, the substantially aligned end portions of the sheet-attaching elements being then brought into more perfect alignment by forcing them past each other radially between dies to an extent such that when relieved from the bending strain they will spring back into the desired positions of alignment.

14. The method of binding sheets of material into book form, which consists in perforating the sheets at spaced intervals along the edges to be bound; preparing a binder having open, partly-formed, sheet-attaching elements with end portions of the approximate curvature of closed, ring-like attaching elements of an assembled binder; pressing the pile of sheets to be bound edgewise between a pair of sheet position-adjusting tools having, respectively, concave and convex contacting surfaces of a degree of curvature approximately equal to that of the end portions of the sheet-attaching elements, the edges of the sheets to be bound being brought into contact with the tool having a convex surface and their opposite edges being brought into contact with the tool having a concave surface, whereby the perforated portions of the sheets will be relatively displaced and thereby disposed in a curved relationship corresponding to the curvature of the end portions of the sheet-attaching elements; thrusting the curved end portions of the attaching elements through the curved portions of the sheets; and closing the attaching elements of the binder by the necessary further bending of the parts requiring such treatment.

EMORY A. TRUSSELL.